US007756510B2

(12) United States Patent
Lee et al.

(10) Patent No.: US 7,756,510 B2
(45) Date of Patent: Jul. 13, 2010

(54) AUTHENTICATION METHOD FOR WIRELESS DISTRIBUTED SYSTEM

(75) Inventors: In-Sun Lee, Seoul (KR); Sang-Boh Yun, Seongnam-si (KR); William Albert Arbaugh, Ellicott City, MD (US); T. Charles Clancy, College Park, MD (US); Min-Ho Shin, Laurel, MD (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1076 days.

(21) Appl. No.: 11/433,679

(22) Filed: May 12, 2006

(65) Prior Publication Data
US 2006/0276176 A1 Dec. 7, 2006

Related U.S. Application Data

(60) Provisional application No. 60/680,584, filed on May 13, 2005.

(30) Foreign Application Priority Data

May 8, 2006 (KR) ...................... 10-2006-0041227

(51) Int. Cl.
*H04M 1/66* (2006.01)
*G06F 7/04* (2006.01)
*H04L 9/00* (2006.01)
*H04L 9/32* (2006.01)

(52) U.S. Cl. .......................... 455/411; 726/4; 380/270; 380/277; 713/168; 713/171

(58) Field of Classification Search ......... 713/168–176; 455/411, 410; 380/30–34, 270–274, 277–286; 705/67, 73; 726/4–10
See application file for complete search history.

(56) References Cited

U.S. PATENT DOCUMENTS 7,346,772 B2 * 3/2008 Rebo et al. .................. 713/155

(Continued)

OTHER PUBLICATIONS

Tingyao Jiang et al., Secure Dynamic Source Routing Protocol, Proceedings of the Fourth International Conference on Computer and Information Technology, 2004 IEEE.

(Continued)

*Primary Examiner*—Lester Kincaid
*Assistant Examiner*—Matthew Sams
(74) *Attorney, Agent, or Firm*—NSIP Law

(57) ABSTRACT

The present invention relates to an authentication method for wireless distribution system including at least one base station providing access service to mobile stations in a coverage of the base station. In the authentication method, an unregistered base station receives an authentication request from a mobile station, multicast an identity request for identifying the mobile station over the wireless distribution system, receives identity responses from at least one base station in response to the identity request, and performs authentication of the mobile station on the basis of the identity responses. The distributed authentication method of the present invention is performed without AAA server, when a new base station is installed or isolated base stations are joined, such that it is possible to extend the network in an easy manner without degradation of the security degree and additional labor burden of the operator.

27 Claims, 8 Drawing Sheets

U.S. PATENT DOCUMENTS

| | | | |
|---|---|---|---|
| 7,350,077 B2 * | 3/2008 | Meier et al. | 713/171 |
| 7,373,508 B1 * | 5/2008 | Meier et al. | 713/168 |
| 7,486,651 B2 * | 2/2009 | Hagiwara et al. | 370/338 |
| 2002/0174335 A1 * | 11/2002 | Zhang et al. | 713/168 |
| 2005/0175009 A1 * | 8/2005 | Bauer | 370/390 |
| 2006/0013398 A1 * | 1/2006 | Halasz et al. | 380/273 |
| 2006/0023887 A1 * | 2/2006 | Agrawal et al. | 380/277 |
| 2006/0179307 A1 * | 8/2006 | Stieglitz et al. | 713/168 |
| 2007/0189249 A1 * | 8/2007 | Gurevich et al. | 370/338 |

OTHER PUBLICATIONS

Han Sang Kim et al., Trust-Propagation Based Authentication Protocol in Multihop Wireless Home Networks, 2006 IEEE.

* cited by examiner

AUTHENTICATION METHOD FOR WIRELESS DISTRIBUTED SYSTEM

PRIORITY

This application claims priority to U.S. Provisional Application entitled "Authentication Method For Wireless Distributed System" filed May 13, 2005 and assigned Ser. No. 60/680,584, and under 35 USC §119 to an application entitled "Authentication Method For Wireless Distributed System" filed in the Korean Intellectual Property Office on May 8, 2006 and assigned Serial No. 2006-41227, the entire contents of both of which are incorporated herein by reference.

BACKGROUND OF INVENTION

1. Field of the Invention

The present invention relates generally to a wireless distribution system and, in particular, to an authentication method for a multi-hop wireless distribution system.

2. Background of the Related Art

A system in networking to control what resources network devices can access is called an authentication, authorization and accounting (AAA) system. In the context of AAA systems, network devices that attempt to gain access to network resources are generally referred to as "supplicants." Typically, system users cause supplicants to request access to particular resources. However, supplicants may also self-initiate access attempts for particular resources. These supplicants typically consist of laptops, desktop PCs, IP phones, virtual private network (VPN) clients, handheld devices, and any other device that may request access to a network resource.

AAA systems include AAA clients and AAA servers. In AAA systems, supplicants typically attempt to gain access to network resources through AAA clients. AAA clients normally reside on network elements such as network access servers (NAS), routers, switches, firewalls, virtual private network (VPN) concentrators, and wireless access points (WAPs). However, AAA clients can reside on any device that facilitates access to network resources. The supplicants attempts are sent to the AAA client, which in turn generates and issues access requests to an AAA server. Typically, AAA servers handle access requests sent by AAA clients to access network resources by maintaining a database of user profiles, querying the database against access requests to verify authenticity, determining resources authorized for use, and accounting for the use of network resources. Communication between the AAA client and AAA server is facilitated via an AAA message protocol such as a Remote Authentication Dial-In User Service (RADIUS) and a Terminal Access Controller Access Control Systems protocol (TACACS+).

FIG. 1 is a diagram illustrating a conventional AAA system, in which the base stations (BSs) 121 and 122 perform authentication procedures by exchanging messages with mobile stations (MSs) 131, 132, 133, and 134 and an AAA server 110 upon receiving access requests from the MSs 131, 132, 133, and 134. In this conventional AAA system, the authorization function is centralized to the AAA server 110 such that the BSs 121 and 122 do not involve the creation of keys for the MS 131, 132, 133, and 134.

However, the conventional AAA protocol is not appropriate for multi-hop wireless distribution system since the additional relay base stations (RBSs) are required as the number of the MSs increases. Also, the conventional AAA system has some drawbacks in that the MS should be registered to the central manager in initial registration, and the installment of the additional BS is complex since the MS should be registered to the central manager. Even in the system having no AAA server, the main BS suffers processing burden since the main BS should make the role of the central manager.

SUMMARY OF THE INVENTION

It is therefore an object of the present invention to solve the above problems. Accordingly, it is an object of the present invention to provide an authentication method of wireless distribution system which is capable of being supported by multi-hop-away base stations.

It is another object of the present invention to provide an authentication method of wireless distribution system which is capable of establishing a shared secret between the base station and the mobile stations without involvement of the AAA server.

It is still another object of the present invention to provide an authentication method of wireless distribution system, which allows for easily extending the network by adding base stations without loss of the security degree and additional labor burden for the operator.

It is still yet another object of the present invention to provide an authentication method of wireless distribution system, which is capable of easily joining at least two isolated systems by establishing a single shared secret between the connecting base stations.

The above objects are achieved with the authentication method of wireless distribution system including at least one base station providing access service to mobile stations in a coverage of the base station. The authentication method includes receiving, at an unregistered base station, an authentication request from a mobile station; multicasting over the wireless distribution system an identity request for identifying the mobile station; receiving identity responses from at least one base station in response to the identity request; and performing authentication of the mobile station based on the identity responses.

Preferably, the step of performing the authentication of the mobile station includes determining whether there are base stations one hop away from the unregistered base station and performing a neighbor-supported authentication if there is at least one one-hop-away base station.

Preferably, the step of performing the authentication of the mobile station further includes performing multi-hop-supported authentication if there is no one—hop-away base station.

Preferably, the step of performing the neighbor-supported authentication includes determining whether or not a number of the one-hop-away base stations is greater than 1, selecting one one-hop-away base station from among the one-hop-away base stations as a target base station if the number of the one-hop-away base stations is greater than 1, and creating a session key shared with the MS on the basis of the identity response received from the target base station.

Preferably, the step of performing the neighbor-supported authentication further includes determining the one-hop-away base station as a target base station if the number of the one-hop-away base stations is not greater than 1.

Preferably, the step of creating the session key includes forwarding the identity response received from the target base station to the mobile station, receiving a transaction request from the MS in response to the identity response, forwarding the transaction request to the target base station, receiving a transaction response from the target base station in response to the transaction request, forwarding the transaction response to the MS, and computing, at the unregistered base station and the mobile terminal, the session key using the transaction response.

Preferably, the transaction request includes a transaction identifier chosen by the mobile station, a mobile station identifier (ID), an unregistered base station ID, a target base station ID, and a secret shared between the target base station and the mobile station. Preferably, the transaction identifier is 256 bits long.

Preferably, the secret shared between the target base station and the mobile station is encrypted with nonces chosen by the mobile terminal and the target base station, the transaction identifier, the mobile station ID, the unregistered base station ID, and the target base station ID.

Preferably, each nonce is 256 bits long. Preferably, the transaction request further includes a secret shared between the target base station and the unregistered base station.

Preferably, the secret shared between the target base station and the unregistered base station is encrypted with nonces chosen by the unregistered base station and the target base station, the transaction identifier, the target base station ID, the mobile station ID, and the unregistered base station ID.

Preferably, the step of receiving the transaction response from the target base station includes computing, at the target base station, a session key, and transmitting the session key with the transaction response. Preferably, the transaction response includes a secret shared between the target base station and the unregistered base station and a secret shared between the target base station and the mobile station. Preferably, the secret between the target base station and the unregistered base station is encrypted with a nonce chosen by the mobile station, a target base station ID, a mobile station ID, and an unregistered base station ID.

Preferably, the secret between the target base station and the mobile station is encrypted with a nonce chosen by the unregistered base station, a target base station ID, a mobile station ID, and an unregistered base station ID.

Preferably, the transaction response includes a secret shared between the target base station and the mobile station. Preferably, the secret between the target base station and the mobile station is encrypted with a nonce chosen by the unregistered base station, a target base station ID, a mobile station ID, an unregistered base station ID.

Preferably, the step of performing the multi-hop-supported authentication includes determining whether a number of the multi-hop-away base station is greater than 1, selecting the base station transmitting the identity response as the target base station if the multi-hop-away base station is not greater than 1, determining whether the target base station has a secret shared with the unregistered base station, and creating a session key shared with the mobile station on the basis of the identity response received from the target base station if the target base station has the secret shared with the unregistered base station.

Preferably, the step of performing the multi-hop-supported authentication further includes establishing a secret to be shared with the target base station if the multi-hop away base station has no secret shared with the unregistered base station.

Preferably, the step of performing the multi-hop-supported authentication further includes determining whether there is any base station having a secret sharing with the unregistered base station among the multi-hop-away base stations transmitted the identity responses if the number of multi-hop-away base station is greater than 1, and selecting one among the multi-hop-away base stations having the secret shared with the unregistered base stations as the target base station if there is at least one multi-hop-away base station sharing the secret with the unregistered base station.

Preferably, the step of performing the multi-hop-supported authentication further includes selecting a closest base station among the multi-hop-away base stations as the target base station if the there is no multi-hop-away base station sharing a secret with the unregistered base station.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Preferred embodiments of the present invention will be described below with reference to the accompanying drawings. In the following description of the present invention, detailed descriptions of well-known functions and structures incorporated herein will be omitted when it may obscure the subject matter of the present invention in unnecessary detail.

Figure 1:
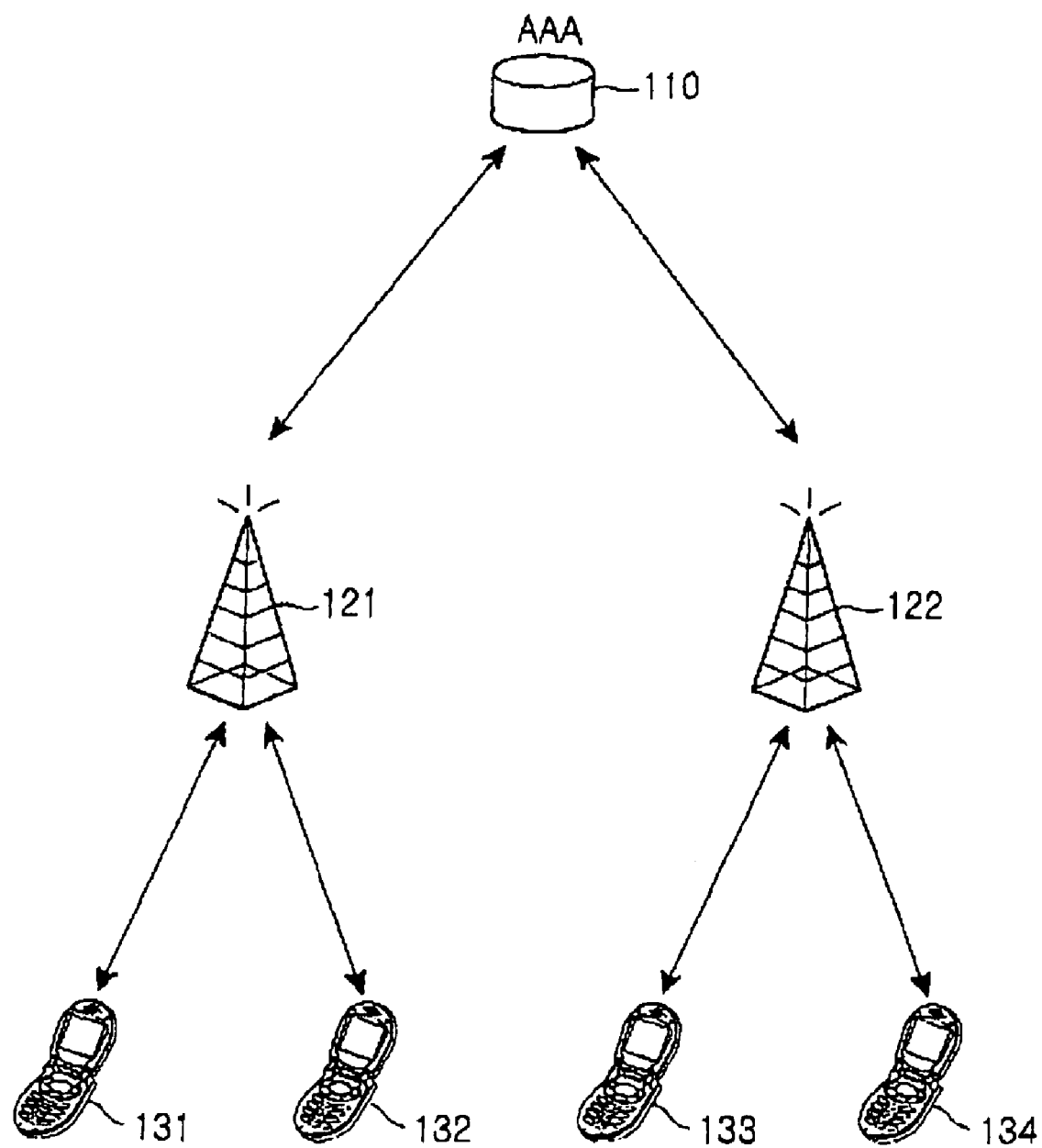
FIG. 1 is a diagram illustrating a conventional AAA system.
Figure 2:
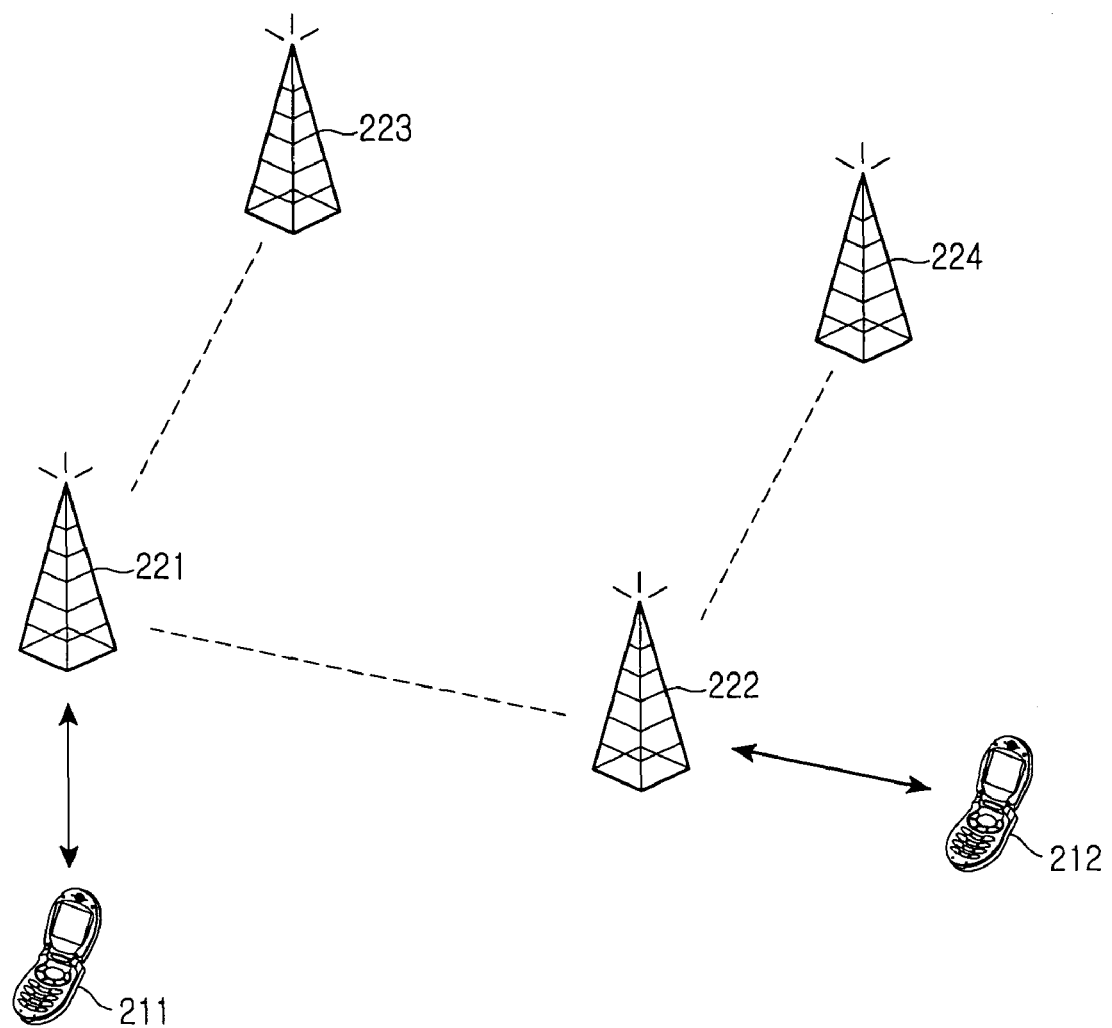
FIG. 2 is a diagram illustrating a wireless distributed authentication system according to the present invention.

FIG. 2 is a diagram illustrating a wireless distributed system according to an embodiment of the present invention. As shown in FIG. 2, the wireless distributed system includes 4 base stations 221, 222, 223, and 224, and the mobile terminals 211 and 212 are registered to the nearest base stations 221 and 222, respectively, in an initial registration. That is, each base station as the authenticator such that the authentication functions are distributed acts among the base stations.

In the wireless distributed system of FIG. 2, two scenarios can be considered. The first is when the mobile station requests association with a base station with which it shares a security association which may be either a shared secret or a public key certificate derived from a common authority. The second is when the mobile station request association with a base station with which it doesn't share a secret. In the first scenario, the 802.11i protocol (or other key derivation protocol) and the extensible authentication protocol (EAP) are used. In the second scenario, the authentication method of the present invention can be operated in conjunction with the 802.11i protocol (or other key derivation protocol).

Initially the authentication procedure without a common security association will be described. When the mobile station requires to associate with a base station which does not share a secret, the base station broadcasts the identification of the mobile station to the wireless distribution system (WDS) for identifying a base station sharing the secret within the WDS. If no base station is found, then the mobile station cannot be authenticated. In case that the base station sharing the secret is found, the authenticating base station may be one-hop, i.e., at least a neighbor away from the requesting base station. In this embodiment, the authentication procedure will be explained in two cases: the neighbor-supported authentication in which the authenticating base station is one-hop-away from requesting base station and the multi-hop-supported authentication in which the authenticating base station is more than one hop from the requesting base station.

Figure 3:
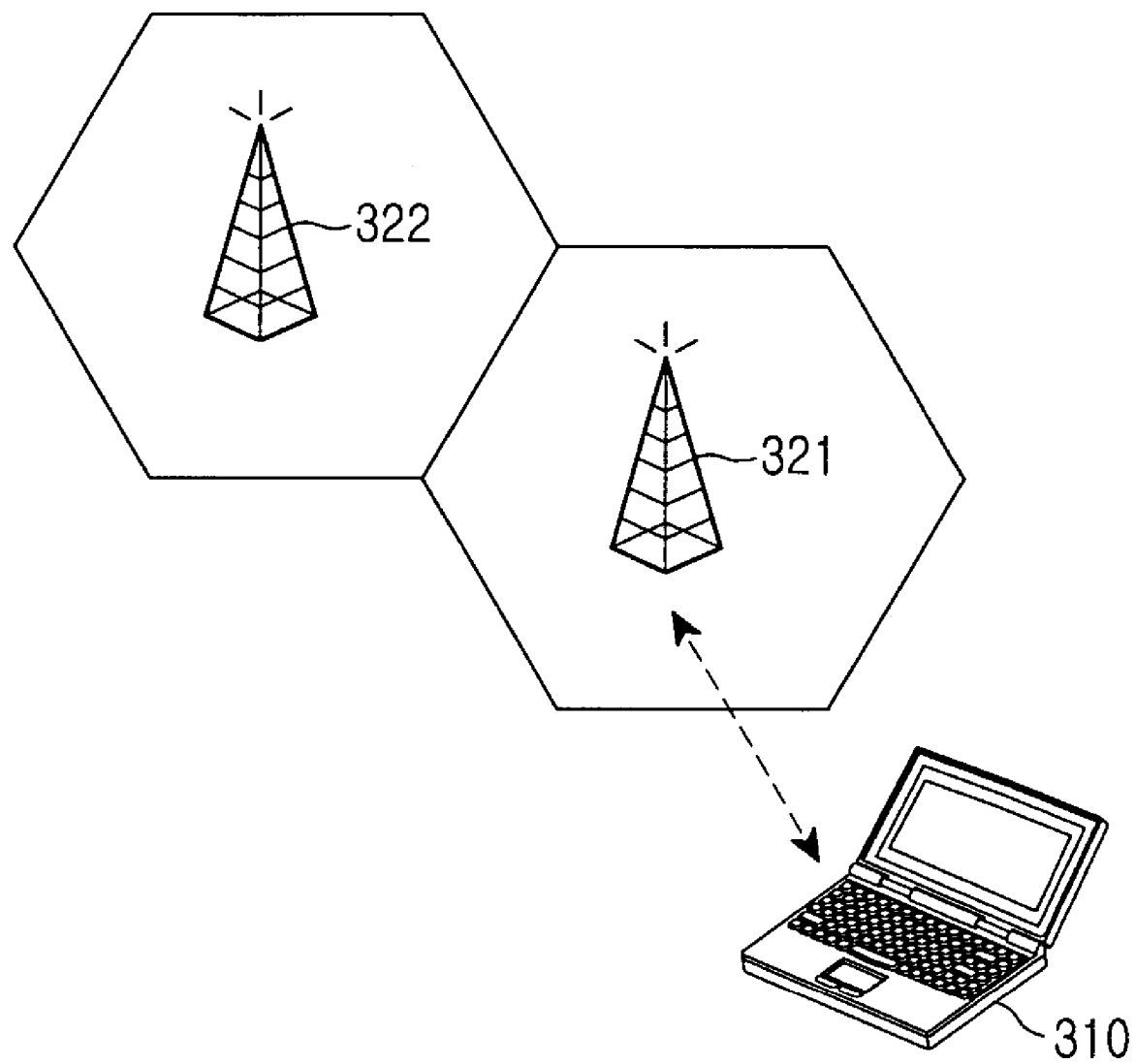
FIG. 3 is a diagram illustrating a neighbor-supported authentication according to the present invention.

FIG. 3 is a diagram illustrating a neighbor-supported authentication according to the present invention. As shown in FIG. 3, the base station 321 finds a neighbor base station 322 for authenticating the mobile station 310.

Figure 4:
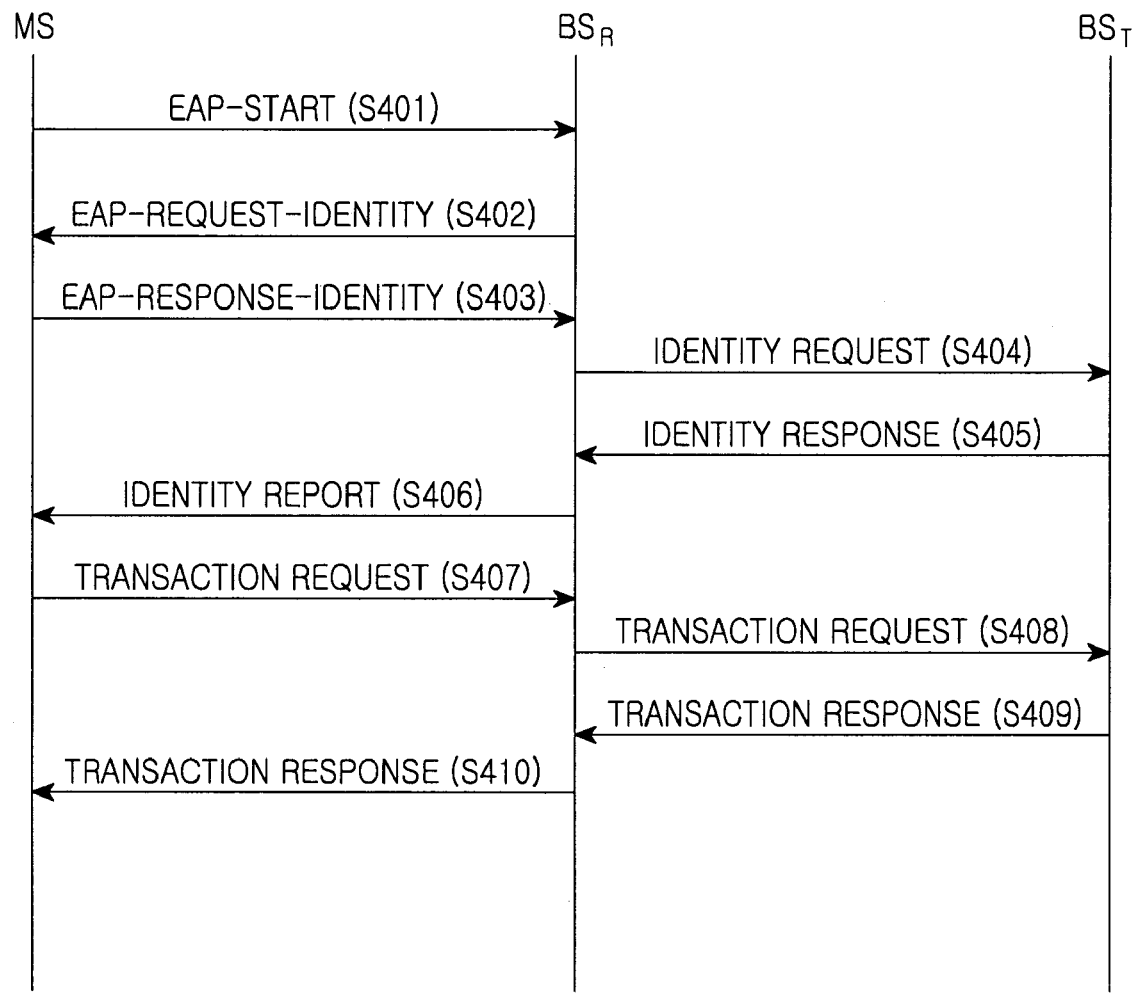
FIG. 4 is a message flow diagram for illustrating the neighbor-supported authentication method according to the present invention.

When a neighbor base station 322 shares a secret with the mobile station 310 and the mobile station 321 shares a secret with the neighbor base station 322, a modified Otway-Reese protocol using EAP can be used for authenticating the mobile station and derive a new fresh secret between the base station 321 and the mobile station 310. FIG. 4 is a message flow diagram for illustrating the neighbor-supported authentication according to the present invention.

Referring to FIG. 4, upon receiving an EAP-START message from the MS at step S401, a base station $BS_R$ having the relay function returns an EAP-REQUEST-IDENTITY message to the MS at step S402. In response to the EAP-REQUEST-IDENTITY message, the MS transmits EAP-RESPONSE-IDENTITY message to the $BS_R$ at step S403.

Upon receiving the EAP-RESPONSE-IDENTITY message, the $BS_R$ multicasts an Identity Request message over the wireless distributed system (WDS) for finding a target base station $BS_T$ to which the MS is previously registered for sharing the secret with the MS at step S404.

Once receiving the Identity Request message, the $BS_T$ transmits Identity Response message including the ID of $BS_T$, an encryption $E_{k_{T\text{-}ad}}(N_T, T)$ of a key shared between the $BS_T$ and the MS, and an encryption of key shared between the $BS_T$ and $BS_R$ $E_{k_{r\text{-}ad}}(N_T, T)$ at step S405. E is an AES-CCM encryption, K is a session key that is generated by $BS_T$, $N_T$ is 256 bit nonces chosen by $BS_T$.

After receiving the Identity Response message, the $BS_R$ transmits an Identity Report message to the MS at step S406. The Identity Response message includes the ID of $BS_T$ and the key encryption $E_{k_{r\text{-}ad}}(N_T, T)$ shared between the $BS_T$ and the MS.

Sequentially, the MS transmits a Transaction Request message, to the $BS_T$, including a 256 bit transaction identifier chosen by MS, MS ID, $BS_R$ ID, $BS_T$ ID, and the key encryption $E_{k_{r\text{-}ad}}(N_{MS}, N_T, M, MS, BS_R, BS_T, T)$, at step S407. $BS_R$ forwards the Transaction Request message, to the $BS_T$, together with the encryption $E_{k_{r\text{-}ad}}(N_{MS}, N_T, M, T, MS, BS_T)$ of key between the $BS_R$ and $BS_T$ at step S408. Upon receiving the Transaction Request message, $BS_T$ computes the session key k with the TLS-PRF: k=TLS-PRF(M,$N_{MS}$,$N_T$,$N_R$), and then transmits a Transaction Response message including the key encryptions $E_{k_{r\text{-}ad}}(N_{MS}, T, MS, BS_T)$ and $E_{k_{r\text{-}ad}}(N_R, T, MS, BS_T)$ to $BS_R$ at step S409. The $BS_R$ forwards the transaction Response containing only the key encryption $E_{k_{r\text{-}ad}}(N_R, T, MS, BS_T)$ to MS at step S410. Consequently, $BS_R$ and MS compute k: k=TLS-PRF(M,$N_{MS}$, $N_T$, $N_R$).

After completion of the above procedure, the $BS_R$ and MS perform the IEEE 802.11i four-way handshake to ensure that only the $BS_R$ and the MS know the derived session key.

If more than one BSs response to the $BS_R$, the $BS_R$ may use any algorithm to select the $BS_T$.

Figure 5:
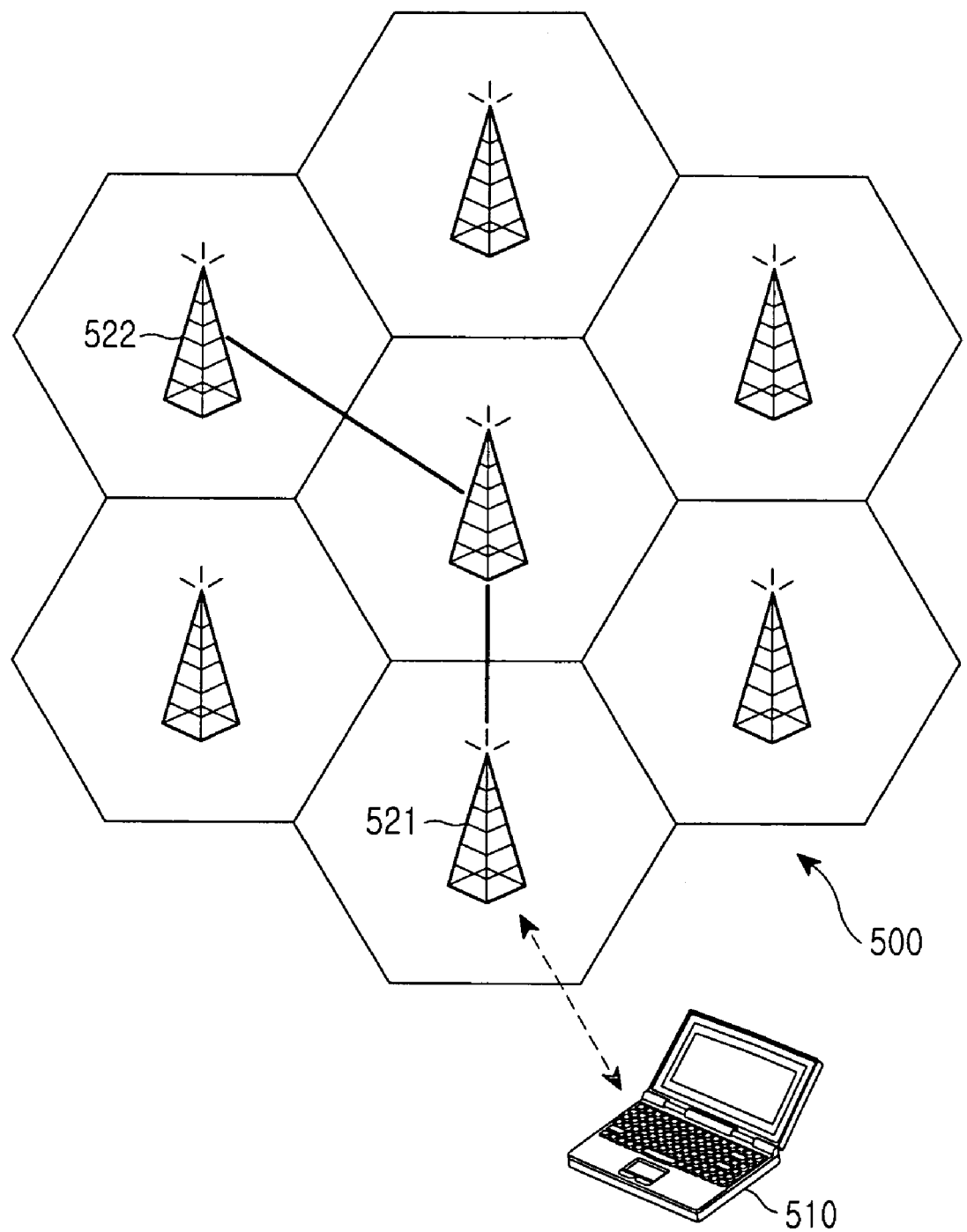
FIG. 5 is a diagram illustrating a multi-hop-supported authentication according to the present invention.

FIG. 5 is a diagram illustrating a multi-hop-supported authentication according to the present invention. As shown in FIG. 5, a $BS_T$ 522 is found at more than one-hop-away from the $BS_R$ 521 in a WDS 500.

When the authenticating $BS_T$ is more than one-hop-away, a secret $K_{T<<R}$ between the $BS_T$ and the $BS_R$ must be established (if it does not exist) for deriving a new fresh secret between the $BS_R$ 521 and a MS 510. As in the neighbor-supported authentication, the MS and the $BS_T$ must share a secret $K_{T<<MS}$.

If these two preconditions are satisfied, then the multi-hop-supported authentication algorithm works exactly as in the neighbor-supported authentication. If the two preconditions are not satisfied, the multi-hop-supported authentication algorithm must fail with the proper EAP failure message.

When a $BS_R$ does not share a secret with an MS requesting authentication, the $BS_R$ must broadcast an identification of the MS to the neighbor BSs with a vendor dependent hop-count. Each neighbor BS in turn decrements the hop-count and forwards the message to its neighbors. If a member of the WDS receives a second duplicate of the message, it discards the message.

When a BS sharing a secret with the MS receives the broadcast message, the BS must responds to the requesting $BS_R$. If the $BS_R$ receives the responses to its broadcast message, it selects the BS which already shares a secret as the $BS_T$. On the other hand, if the $BS_R$ does not share a secret with any of the responding BSs, then it selects the closest BS responded to the broadcast message as the $BS_T$ and establishes a secret to be shared with the $BS_T$ before responding to the MS.

In case that the MS sees that some $BS_S$ share a secret with the $BS_R$, the MS caches the result and transmits the request message in unicast rather than multicast. If the $BS_R$ see that some BSs shares a secret with the MS, the $BS_R$ caches the result and unicasts the request message to the BSs in next transmission. Also, the $BS_R$ can cache the result of the authentication of the MS. When the MS attempts to access the $BS_R$ having the authentication result, the $BS_R$ can authenticate the MS directly via traditional EAP.

Figure 6:
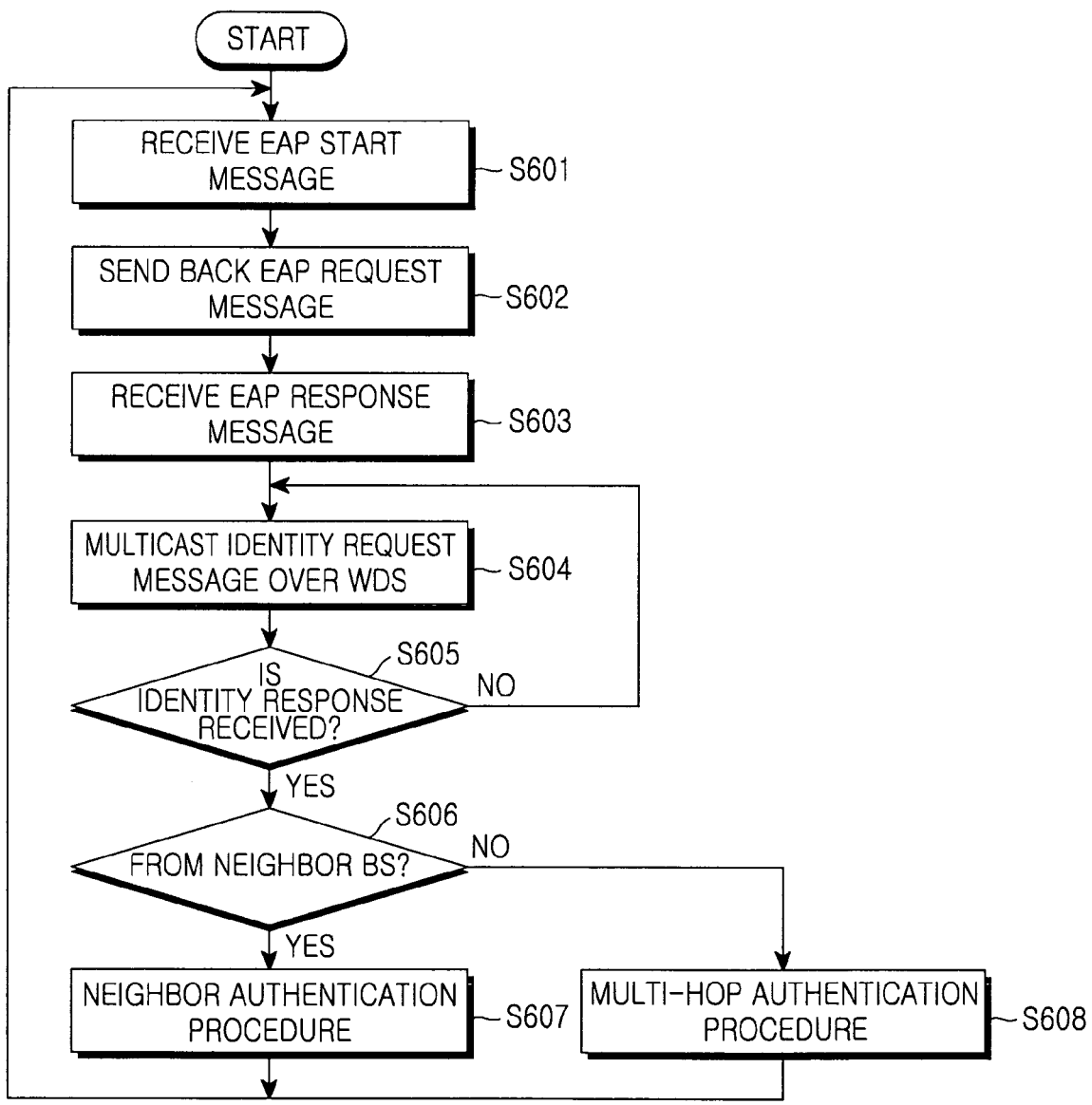
FIG. 6 is a flowchart illustrating a wireless distributed authentication method according to the present invention.

FIG. 6 is a flowchart illustrating a distributed authentication method according to the present invention. Referring to FIG. 6, once the $BS_R$ receives an EAP-START message from a MS at step S601, it transmits an EAP Request message back to the MS at step S602 and receives an EAP Response message from the MS in response to the EAP Request message at step S603. Upon receiving the EAP Response message, the $BS_R$ multicasts an Identity Request message over WDS for locating a $BS_T$ at step S604. After multicasting the Identity Request message, the $BS_R$ determines whether any Identity Response message is received at step S605. If there is no Identity response message in a predetermined period, the $BS_R$ retransmit the Identity Request message. The retransmission is executed out in predetermined times. If the Identity Response message is received from at least one BS, the $BS_R$ determines whether there is BS which is one-hop-away from $BS_R$ among the BSs transmitting the identity Response message, i.e., neighbor BS, at step S606. If there is a neighbor BS, the $BS_R$ performs a Neighbor-supported authentication procedure at step S607. Otherwise, the $BS_R$ performs Multi-hop-supported authentication procedure at step S608.

Figure 7:
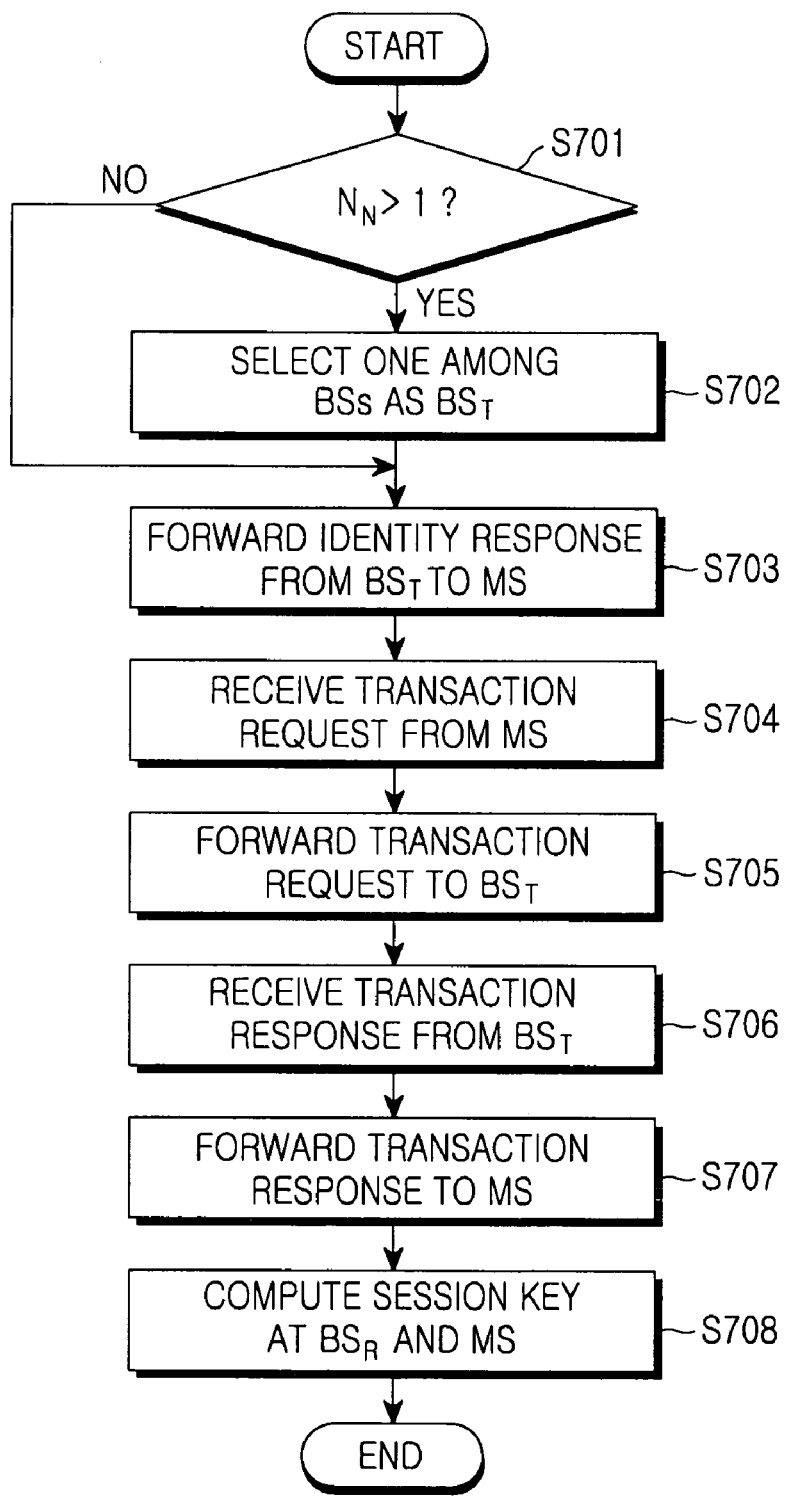
FIG. 7 is a flowchart illustrating the neighbor-supported authentication procedure of FIG. 6 in detail.

FIG. 7 is a flowchart illustrating the neighbor-supported authentication procedure of FIG. 6 in detail. Referring to FIG. 7, once the $BS_R$ enters the neighbor-supported authentication procedure, it counts the number $N_N$ of the neighbor BS transmitting the Identity Response and determines whether $N_N$ message is greater than 1 at step S701. If $N_N$ is greater than 1, the $BS_R$ selects one among the BSs as $BS_T$ at step S702. The $BS_T$ selection can be carried out with various selection algorithms. Once the $BS_T$ is selected, the $BS_R$ forwards the Identity Response received from the $BS_T$ to the MS at step S703.

Sequentially, the $BS_R$ receives a Transaction Request message from the MS at step S704. The Transaction Request message includes a 256 bit transaction identifier chosen by MS, MS ID, $BS_R$ ID, $BS_T$ ID, and the key encryption $E_{Kr-ui}(N_{MS},N_T,M,MS,BS_R,BS_T,T)$. Thereafter, the $BS_R$ transmits the Transaction Request message to the $BS_T$ at step S705. The transmitted Transaction Request message further includes the encryption $E_{Kr-ui}(N_{MS},N_T,M,T,MS,BS_T)$ of key between the $BS_R$ and $BS_T$.

Upon receiving the Transaction Request message, $BS_T$ computes the session key k with the TLS-PRF: k=TLS-PRF(M, $N_{MS},N_T,N_R$), and then transmits a Transaction Response message including the key encryptions $E_{Kr-ui}(N_{MS},T,MS,BS_T)$ and $E_{Kr-ui}(N_R,T,MS,BS_T)$, such that the $BS_R$ receives the Transaction Response message at step S706 and then forwards the Transaction Response message to the MS at step S707. The forwarded Transaction Response message includes only the key encryptions $E_{Kr-ui}(N_R,T,MS,BS_T)$. After transmitting the Transaction Response message, the $BS_R$ computes session key at step S708. The session key is computed by the $BS_R$ and MS at the same time as k=TLS-PRF $(M,N_{MS},N_T,N_R)$.

Figure 8:
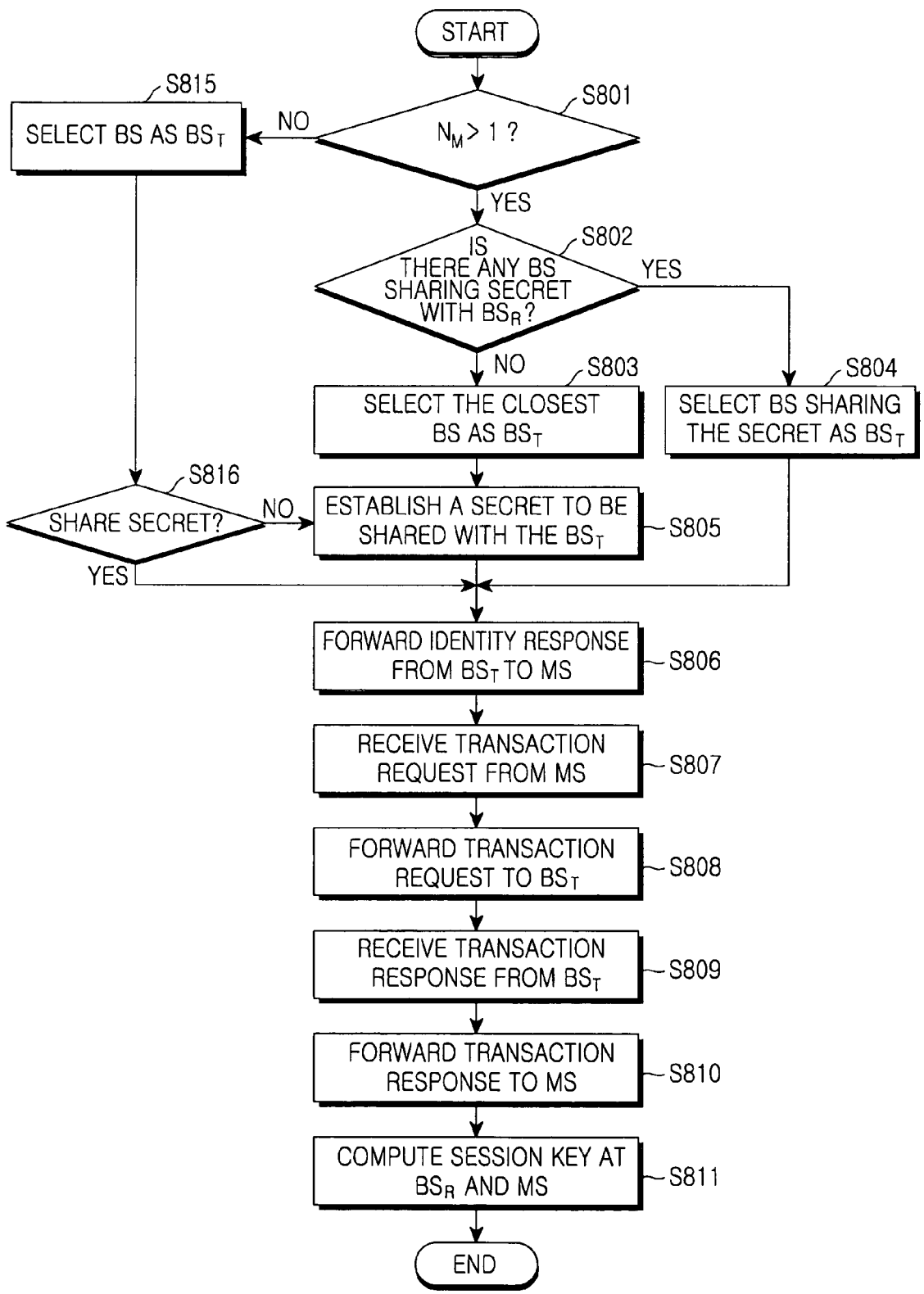
FIG. 8 is a flowchart illustrating the multi-hop-supported authentication procedure of FIG. 6 in detail.

FIG. 8 is a flowchart illustrating the multi-hop-supported authentication procedure of FIG. 6 in detail. Referring to FIG. 8, once the $BS_R$ enters the multi-hop-supported authentication procedure, it determines whether the number $N_M$ of the multi-hop BS transmitting the Identity Response message is greater than 1 at step S801. If $N_M$ is greater than 1, the $BS_R$ determines whether there is any BS sharing a secret with itself at step S802. If there is any BS sharing a secret with the $BS_R$, the $BS_R$ selects the BS sharing the secret with itself as the $BS_T$ at step S804 and then transmits the Identity Response message received from the $BS_T$ to the MS at step S806. In case that the number of BS sharing the secret is greater than 1, the $BS_R$ can select one of the BSs as $BS_T$ with a selection parameter such as hop count.

If there is no BS sharing a secret with the $BS_R$ at step S802, the $BS_R$ selects a closest BS among the BSs transmitting the Identity Response message as $BS_T$ at step S803 and then establishes a secret shared with the $BS_T$ at step S805. After establishing the secret, the $BS_R$ forwards the Identity Response message received from the $BS_T$ which shares the secret to the MS at step S806.

If it is determined that the $N_M$ is not greater than 1 at step S801, the $BS_R$ selects the only one BS transmitting the Identity Response message as the $BS_T$ at step S815 and then determines whether or not the $BS_T$ has a secret sharing with itself at step S816. If the $BS_T$ has a secret sharing with the $BS_R$, the $BS_R$ forwards the Identity Response message received from the $BS_T$ to the MS at step S806.

On the other hand, if the $BS_T$ does not have a secret sharing with the $BS_R$, the $BS_R$ establish a secret to be shared with the $BS_T$ at step S805 and then forwards the Identity Response message received from the $BS_T$ to the MS at step S806.

After forwarding the Identity Response message, the $BS_R$ waits and receives a Transaction Request message from the MS at step S807. The Transaction Request message includes a 256 bit transaction identifier chosen by MS, MS ID, $BS_R$ ID, $BS_T$ ID, and the key encryption $E_{Kr-ui}(N_{MS},N_T,M,MS,BS_R,BS_T,T)$. Thereafter, the $BS_R$ forwards the Transaction Request message to the $BS_T$ at step S808. The forwarded Transaction Request message further includes the encryption $E_{Kr-ui}(N_{MS},N_T,M,T,MS,BS_T)$ of key between the $BS_R$ and $BS_T$. Upon receiving the Transaction Request message, $BS_T$ computes the session key k with the TLS-PRF: k=TLS-PRF $(M,N_{MS},N_T,N_R)$, and then transmits a Transaction Response message including the key encryptions $E_{Kr-ui}(N_{MS},T,MS,BS_T)$ and $E_{Kr-ui}(N_R,T,MS,BS_T)$, such that the $BS_R$ receives the Transaction Response message at step S809 and then forwards the Transaction Response message to the MS at step S810. The forwarded Transaction Response message includes only the key encryptions $E_{Kr-ui}(N_R,T,MS,BS_T)$. After transmitting the Transaction Response message, the $BS_R$ computes session key at step S811. The session key is computed by the $BS_R$ and MS at the same as k=TLS-PRF $(M,N_{MS},N_T,N_R)$.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims. As described above, the distributed authentication method of the present invention distributes the authentication management to the base stations such that it is possible to simplify the authentication procedure without a central manager such as AAA server.

Also, since the distributed authentication method of the present invention is performed without AAA server when a new base station is installed or isolated base stations are joined, it is possible to extend the network in an easy manner without degradation of the security degree and additional labor burden of the operator.

Furthermore, with the simplified authentication procedures without the central management device, the distributed authentication method of the present invention can join at least two isolated systems within a wireless distributed system by establishing a single shared secret between the two base stations.

What is claimed is:

1. An authentication method for a wireless distribution system including a plurality of base stations providing access service to mobile stations, the method comprising:
   receiving, at an unregistered base station, an authentication request from a mobile station;
   multicasting, by the unregistered base station, an identity request for identifying the mobile station to the plurality of base stations of the wireless distribution system;
   receiving, by the unregistered base station, an identity response from at least one base station among the plurality of base stations in response to the identity request; and
   performing, by the unregistered base station, authentication of the mobile station on the basis of the identity response,
   wherein performing authentication of the mobile station includes:
      determining whether there are base stations one-hop-away from the unregistered base station; and
      performing a neighbor-supported authentication if there is at least one one-hop-away base station;
   wherein performing neighbor-supported authentication includes:
      determining whether a number of the one-hop-away base stations is greater than 1;
      selecting one of the one-hop-away base stations from among the one-hop-away base stations as a target base station if the number of the one-hop-away base stations is greater than 1;
creating a session key shared with the mobile station on the basis of the identity response received from the target base station; and
determining the one-hop-away base station as a target base station if the number of the one-hop-away base stations is not greater than 1;
wherein creating the session key includes:
transmitting the identity response received from the target base station to the mobile station;
receiving a transaction request from the mobile station in response to the identity response;
transmitting the transaction request to the target base station;
receiving a transaction response from the target base station in response to the transaction request;
transmitting the transaction response to the mobile station; and
computing, at the unregistered base station and the mobile terminal, the session key using the transaction response; and
wherein the transaction request includes a transaction identifier chosen by the mobile station, a mobile station ID, an unregistered base station ID, a target base station ID, and a secret shared between the target base station and the mobile station.

2. The method of claim 1, wherein the transaction identifier is 256 bits long.

3. The method of claim 1, wherein the secret shared between the target base station and the mobile station is encrypted with nonces chosen by the mobile terminal and the target base station, the transaction identifier, the mobile station ID, the unregistered base station ID, and the target base station ID.

4. The method of claim 3, wherein each nonce is 256 bits long.

5. The method of claim 1, wherein the transaction request further includes a secret shared between the target base station and the unregistered base station.

6. The method of claim 5, wherein the secret shared between the target base station and the unregistered base station is encrypted with nonces chosen by the unregistered base station and the target base station, the transaction identifier, the target base station ID, the mobile station ID, and the unregistered base station ID.

7. An authentication method for a wireless distribution system including a plurality of base stations providing access service to mobile stations, the method comprising:
receiving, at an unregistered base station, an authentication request from a mobile station;
multicasting, by the unregistered base station, an identity request for identifying the mobile station to the plurality of base stations of the wireless distribution system;
receiving, by the unregistered base station, an identity response from at least one base station among the plurality of base stations in response to the identity request; and
performing, by the unregistered base station, authentication of the mobile station on the basis of the identity response;
wherein performing authentication of the mobile station includes:
determining whether there are base stations one-hop-away from the unregistered base station; and
performing a neighbor-supported authentication if there is at least one one-hop-away base station;
wherein performing neighbor-supported authentication includes:
determining whether a number of the one-hop-away base stations is greater than 1;
selecting one of the one-hop-away base stations from among the one-hop-away base stations as a target base station if the number of the one-hop-away base stations is greater than 1;
creating a session key shared with the mobile station on the basis of the identity response received from the target base station; and
determining the one-hop-away base station as a target base station if the number of the one-hop-away base stations is not greater than 1;
wherein creating the session key includes:
transmitting the identity response received from the target base station to the mobile station;
receiving a transaction request from the mobile station in response to the identity response;
transmitting the transaction request to the target base station;
receiving a transaction response from the target base station in response to the transaction request;
transmitting the transaction response to the mobile station; and
computing, at the unregistered base station and the mobile terminal, the session key using the transaction response;
wherein receiving the transaction response from the target base station includes:
computing, at the target base station, a session key; and
transmitting the session key with the transaction response, and
wherein the transaction response includes a secret shared between the target base station and the unregistered base station and a secret shared between the target base station and the mobile station.

8. The method of claim 7, wherein the secret shared between the target base station and the unregistered base station is encrypted with a nonce chosen by the mobile station, a target base station ID, a mobile station ID, and an unregistered base station ID.

9. The method of claim 7, wherein the secret shared between the target base station and the mobile station is encrypted with a nonce chosen by the unregistered base station, a target base station ID, a mobile station ID, and an unregistered base station ID.

10. An authentication method for a wireless distribution system including a plurality of base stations providing access service to mobile stations, the method comprising:
receiving, at an unregistered base station, an authentication request from a mobile station;
multicasting, by the unregistered base station, an identity request for identifying the mobile station to the plurality of base stations of the wireless distribution system;
receiving, by the unregistered base station, an identity response from at least one base station among the plurality of base stations in response to the identity request; and
performing, by the unregistered base station, authentication of the mobile station on the basis of the identity response;

wherein performing authentication of the mobile station includes:
  determining whether there are base stations one-hop-away from the unregistered base station; and
  performing a neighbor-supported authentication if there is at least one one-hop-away base station;
wherein performing neighbor-supported authentication includes:
  determining whether a number of the one-hop-away base stations is greater than 1;
  selecting one of the one-hop-away base stations from among the one-hop-away base stations as a target base station if the number of the one-hop-away base stations is greater than 1;
  creating a session key shared with the mobile station on the basis of the identity response received from the target base station; and
  determining the one-hop-away base station as a target base station if the number of the one-hop-away base stations is not greater than 1;
wherein creating the session key includes:
  transmitting the identity response received from the target base station to the mobile station;
  receiving a transaction request from the mobile station in response to the identity response:
  transmitting the transaction request to the target base station;
  receiving a transaction response from the target base station in response to the transaction request;
  transmitting the transaction response to the mobile station; and
  computing, at the unregistered base station and the mobile terminal, the session key using the transaction response;
wherein receiving the transaction response from the target base station includes:
  computing, at the target base station, a session key; and
  transmitting the session key with the transaction response and
wherein the transaction response includes a secret shared between the target base station and the mobile station, and the secret between the target base station and the mobile station is encrypted with a nonce chosen by the unregistered base station, a target base station ID, a mobile station ID, an unregistered base station ID.

11. An authentication method for a wireless distribution system including at least one base station providing access service to mobile stations in a coverage area of the base station, comprising:
  receiving, at an unregistered base station, an authentication request from a mobile station;
  multicasting over the wireless distribution system an identity request for identifying the mobile station;
  receiving an identity response from at least one base station in response to the identity request; and
  performing authentication of the mobile station on the basis of the identity response, wherein the step of performing the authentication of the mobile station includes:
    determining whether there are base stations one-hop-away from the unregistered base station;
    performing a neighbor-supported authentication if there is at least one one-hop-away base station; and
    performing multi-hop-supported authentication with base stations more than two hops away if there is no one-hop-away base station,
  wherein the step of performing the multi-hop-supported authentication includes:
    determining whether a number of the multi-hop-away base station is greater than 1;
    selecting the base station that transmitted the identity response as the target base station if the multi-hop-away base station is not greater than 1;
    determining whether the target base station has a secret shared with the unregistered base station; and
    creating a session key shared with the mobile station on the basis of the identity response received from the target base station if the target base station has the secret shared with the unregistered base station.

12. The method of claim 11, wherein the step of performing the multi-hop-supported authentication further includes:
  establishing a secret to be shared with the target base station if the multi-hop away base station has no secret shared with the unregistered base station.

13. The method of claim 12, wherein the step of performing the multi-hop-supported authentication further includes:
  determining whether there is any base station having a secret sharing with the unregistered base station among the multi-hop-away base stations transmitted the identity responses if the number of multi-hop-away base station is greater than 1; and
  selecting one of the multi-hop-away base stations from among the multi-hop-away base stations having the secret shared with the unregistered base stations as the target base station if there is at least one multi-hop-away base station sharing the secret with the unregistered base station.

14. The method of claim 13, wherein the step of performing the multi-hop-supported authentication further includes:
  selecting a closest base station among the multi-hop-away base stations as the target base station if there is no multi-hop-away base station sharing a secret with the unregistered base station.

15. The method of claim 14, wherein the step of creating the session key includes:
  forwarding the identity response received from the target base station to the mobile station;
  receiving a transaction request from the mobile station in response to the identity response;
  forwarding the transaction request to the target base station;
  receiving a transaction response from the target base station in response to the transaction request;
  forwarding the transaction response to the mobile station; and
  computing, at the unregistered base station and the mobile terminal, the session key using the transaction response.

16. The method of claim 15, wherein the transaction request includes a transaction identifier chosen by the mobile station, a mobile station ID, an unregistered base station ID, a target base station ID, and a secret shared between the target base station and the mobile station.

17. The method of claim 16, wherein the transaction identifier is 256 bits long.

18. The method of claim 16, wherein the secret shared between the target base station and the mobile station is encrypted with nonces chosen by the mobile station and the target base station, the transaction identifier, the mobile station ID, the unregistered base station ID, and the target base station ID.

19. The method of claim 18, wherein each nonce is 256 bits long.

20. The method of claim 16, wherein the transaction request further includes a secret shared between the target base station and the unregistered base station.

21. The method of claim 20, wherein the secret shared between the target base station and the unregistered base station is encrypted with nonces chosen by the unregistered base station and the target base station, the transaction identifier, the target base station ID, the mobile station ID, and the unregistered base station ID.

22. The method of claim 15, wherein the step of receiving the transaction response from the target base station includes:

computing, at the target base station, a session key; and transmitting the session key with the transaction response.

23. The method of claim 22, wherein the transaction response includes a secret shared between the target base station and the unregistered base station and a secret shared between the target base station and the mobile station.

24. The method of claim 23, wherein the secret shared between the target base station and the unregistered base station is encrypted with a nonce chosen by the mobile station, a target base station ID, a mobile station ID, an unregistered base station ID.

25. The method of claim 23, wherein the secret shared between the target base station and the mobile station is encrypted with a nonce chosen by the unregistered base station, a target base station ID, a mobile station ID, an unregistered base station ID.

26. The method of claim 22, wherein the transaction response includes a secret shared between the target base station and the mobile station.

27. The method of claim 26, wherein the secret shared between the target base station and the mobile station is encrypted with a nonce chosen by the unregistered base station, a target base station ID, a mobile station ID, an unregistered base station ID.

* * * * *